March 21, 1967 J. C. KING ETAL 3,310,720
POLARIZATION PROCESS FOR CERAMICS
Filed Jan. 3, 1964
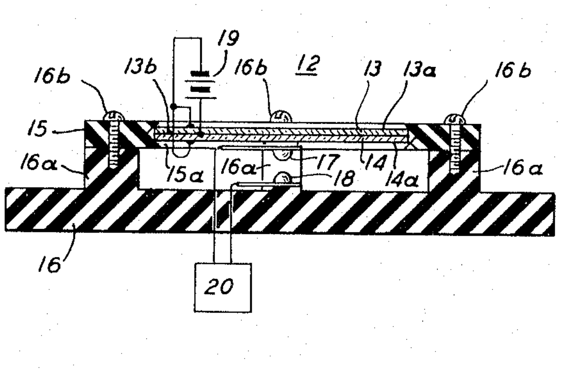
INVENTORS: J. C. KING
N. C. THOMAS
BY Edward M. Fink
ATTORNEY 3,310,720

POLARIZATION PROCESS FOR CERAMICS

James C. King, Center Valley, and Neal C. Thomas, Allentown, Pa., assignors to Bell Telephone Laboratories, Incorporated, New York, N.Y., a corporation of New York Filed Jan. 3, 1964, Ser. No. 335,692

6 Claims. (Cl. 317—262)

This invention relates to pulse techniques for polarizing ferroelectric ceramic materials. These techniques are particularly useful as applied in thin sections of niobate ceramics.

Certain ferroelectric materials of which barium titanate, potassium-sodium niobate, lead zirconate and related systems are notable examples are known to possess electrostrictive and piezoelectric properties in such a degree as to adapt them for use in microphones, telephone receivers, electrostrictive relays and other electromechanical transducers. Such materials are commonly incorporated in a ceramic, or otherwise arranged to form a solid polycrystalline aggregate which is then cut to form a disc, strip or like element. The latter is provided with a mechanical mounting suitable for a prescribed mode of mechanical vibration and also with electrodes placed conformably with the vibrational mode.

The electrical-mechanical conversion of such bodies is enhanced if the element is polarized, that is, if the electrically polarized ferroelectric domains within the material have preponderantly a certain orientation relative to the vibrational pattern and the electrodes, and the degree of conversion (or the electromechanical coupling coefficient) depends on the degree of polarization or extent to which the domains have the same specified orientation. Techniques have been developed heretofore for polarizing ferroelectric elements so that some of the domains are caused to assume and retain the desired orientation. In accordance with one of these polarizing techniques, the ferroelectric element is subjected to an intense electric field for a protracted period. In accordance with another and favored technique, the element is heated to a temperature above its Curie temperature, a polarizing electric field is applied to the electrodes, and the field is maintained while the element cools.

In accordance with the present invention, a pulsed technique for polarizing ceramic bodies is described wherein polarization is attained in a far shorter period of time than is normally required in the conventional prior art processes. Additional advantages accrue upon the application of the described technique to thin sections wherein the prior art problems of warping and cracking are alleviated.

The inventive technique involves application to the element of a pulsed electrical field of specified pulse length and amplitude over a range of temperatures of such value as to avoid the necessity of maintaining the element in the poling field while cooling, prior art poling processes requiring a substantial cooling period in the field to prevent depolarization.

More specifically, it has been observed that poling of a ceramic body is substantially achieved during the rise time of a pulsed generator. Useful pulse lengths have been found to range from about 20 milliseconds to approximately a quarter of a second with a low limit being introduced by the apparatus utilized. Adequate poling may be attained by pulse lengths as short as those corresponding with domain wall switching times (of the order of several microseconds). Alternatively, increased pulse lengths or repetitive pulses may be used. However, experimental results do not justify the increased apparatus or processing expenses introduced by such variations.

Adequate poling has been attained over a broad temperature range of from 20° C. up to temperatures about a transition point of the subject material. However, since one of the advantages resulting from this invention is the elimination of the need for cooling in the field, the inventive process is desirably conducted at a temperature such that depolarization effects are at a minimum upon removal of the field. For the niobate and other common ceramic systems this consideration indicates a preferred maximum temperature of about 180° C.

It has been found that the poling fields adequate for prior art techniques are suitably applied herein, such values being well known to those skilled in the art. In the niobate systems, they range from 30 to 60 volts per mil.

It has been indicated that an advantage of the inventive process is the appreciable shortened processing time, in part resulting from the elimination of the requirement for cooling in the applied field. It has also been indicated that a further advantage accrues where the ceramic section is thin in that warping or cracking associated with prior art techniques is minimized. Such sections, which are desirably hot pressed for increased density and generally improved physical characteristics, may range from 1 or 2 mils to 20 or 30 mils and it is for this reason that operation on these sections is considered a preferred embodiment.

The invention will be more easily understood by reference to the accompanying drawing wherein:

The figure is an elevational view in cross section of a high-speed electrostrictive relay having polarized plates of potassium-sodium niobate prepared in accordance with the present invention.

With reference now to the figure, there is shown a bimorph ceramic disc 12 comprised of circular plates 13 and 14 of potassium-sodium niobate mounted at its edge in a V-shaped recess 15*a* in the circular wall of the drilled plate 15, plate 15 being made of rigid insulating material such as wood or plastic. Disc 12 is freely mounted in the recess plate 15 so that it may have a center flexure motion. Plate 15 is split into two separable halves across its diameter to facilitate maintaining of the bimorph disc, and is connected by screws 16*b* to equally spaced legs 16*a* which are a part of the base plate 16 and are made of rigid insulating material. Electrical contacts 17 and 18 having insulated mounting portions are connected, one to the center of one face of the bimorph disc 12 and the other to the base plate 16, so that a center flexing motion of the disc will cause the contacts to close.

Each of the ceramic discs 13 and 14 may be obtained for any material by conventional procedures. A particularly useful technique for the potassium-sodium niobate system is described in U.S. Patent 2,976,246 granted March 21, 1961. In brief, that procedure involves the steps of mixing and grinding sodium carbonate ($Na_2CO_3$), potassium carbonate and niobium pentoxide ($Nb_2O_5$) in proportions calculated to produce the desired composition. As an illustration, in the preparation of a ceramic of the composition $K_{.5}Na_{.5}$ ($NbO_3$), the ingredients are mixed in the ratio of one-half mole of sodium carbonate, one-half mole of potassium carbonate, and one mole of niobium pentoxide. This mixture of ingredients is then calcined, preferably at a temperature in the range of 900° C. to 975° C.

The resultant material is leached with a dilute hot aqueous potassium carbonate solution. After drying, the material is hot pressed into the desired shape.

Following, the ceramic shape is polarized in the manner described to impart a high electromechanical coupling coefficient to the material. To accomplish the polarization, the ceramic is lapped to the required thickness and poling electrodes are placed on the major faces of the disc with electroless nickel. The ceramic disc is then immersed in an oil bath which is maintained at a temperature below the second transition temperature which, for potassium-sodium niobate, is approximately 196° C. It has been determined that polarizing at a temperature within the range of 20° C. to 190° C. produces satisfactory results, a preferred range being 50° C. to 180° C., and an optimum range being 120° C. to 150° C. After the ceramic has reached the polarization temperature a direct current field of the order of 30 to 60 volts per mil is applied across the electrodes as a pulse of 20 to 250 milliseconds duration. Immediately after the application of the pulse, the ceramic is removed from the oil bath and permitted to cool to room temperature without the influence of the polarizing field.

To permit application of an electric field to the polarized bimorph disc 12, flexible, conductive electrodes are affixed to its planar surfaces, a common electrode 13*b* being centered between discs 13 and 14 which are, in turn, cemented together so that the joined faces of the two discs are of opposite polarity with disc 13 being poled towards the jointure. Electrodes 13*a* and 14*a* are affixed, respectively, to the exposed faces of discs 13 and 14 of the bimorph disc 12.

One conductor of an electric source 19 is shown connected to the common electrode 13*b* and its other conductor is shown connected to the outer electrodes 13*a* and 14*a* so that electric fields are set up which cause center flexure motion in the bimorph. The field in disc 13 supports the poling of that disc and tends to cause the disc to decrease in diameter, while the opposing field in disc 14 tends to cause that disc to increase in diameter. The resultant motion is a flexure at the center of the bimorph disc 12 that causes contacts 17 and 18 to meet and close the electric circuit 20.

An example of the application of the present invention is set forth below. It is intended merely as illustration, and it is to be appreciated that the methods described may be varied by one skilled in the art without departing from the spirit and scope of the present invention.

*Example*

The following quantities of components were weighed, the amounts corresponding in proportion to 1.001 moles of potassium carbonate, 1.001 moles of sodium carbonate and two moles of niobium pentoxide.

| | Grams |
|---|---|
| Potassium carbonate | 76.17 |
| Sodium carbonate | 58.43 |
| Niobium pentoxide | 292.40 |

This composition provides a 1/10 mole percent excess of each carbonate over the stoichiometric quantities.

The above-measured quantities were placed into a ball mill of one quart capacity. Approximately one-third of a quart of alumina balls, ¾ inch in diameter, and 300 cubic centimeters of absolute ethyl alcohol were also placed in the ball mill. The materials were milled for 16 hours. The mixture of components was then dried in an oven at a temperature of 105° C. and sieved through a 100 mesh screen.

The screened material was placed in a platinum crucible, which was inserted in an electric "Globar" furnace maintained at 950° C. The material was allowed to remain in the furnace for a period of 16 hours after which the crucible was removed and allowed to cool to room temperature. The calcined material was screened through a 40 mesh screen and then leached with a hot aqueous solution of potassium carbonate, 2 percent by weight. This leaching step was repeated twice and the resultant solid washed with boiling distilled water until the wash water tested to a pH of 7.

The solid was then filtered and dried in an oven at a temperature of approximately 105° C. Following the drying, the solid material was screened using a 100 mesh screen. The dried powder was pressed in the shape of a disc .5 inch in diameter and .125 inch thick using a pressure of approximately 5000 pounds per square inch at 1100° C. for 10 minutes utilizing a conventional hot pressing technique.

Electroless nickel was applied to segments of the disc .004 inch thick to provide metal electrodes for shear mode polarization. Electrical lead wires were connected to these electrodes and the ceramic immersed in a silicone oil which was heated to a temperature of 150° C. A direct current potential of 57 volts was applied across the ceramic disc as a pulse of 40 milliseconds duration. Immediately after the application of the pulse, the disc was removed from the oil bath and permitted to cool without the field.

The resultant disc was tested and found to have an electromechanical coupling coefficient of 60.2 percent measured in the shear mode and was not cracked or warped during polarization.

While the invention has been described in detail in the foregoing specification and the drawings similarly illustrate the same, the aforesaid is by way of illustration only, and it is not restrictive in character. The several modifications which will readily suggest themselves to persons skilled in the art are all considered within the scope of the invention, reference being had to the appended claims.

What is claimed is:

1. A method for polarizing a ceramic body of a ferroelectric material which comprises applying to said body a unidirectional electrical field, sufficient to pole said body, as a pulse ranging from a few microseconds to approximately 250 milliseconds duration.

2. A method in accordance with the procedure of claim 1 wherein said body is potassium-sodium niobate in which the temperature of said body is maintained within the range of 20–190° C. and in which said applied field is within the range of 30 to 60 volts per mil.

3. A method in accordance with the procedure of claim 2 wherein said body is maintained within the range of 50–180° C.

4. A method in accordance with the procedure of claim 3 wherein said body is maintained within the range of 120–150° C.

5. A method in accordance with the procedure of claim 4 wherein said body is hot pressed and has a minimum dimension ranging from 1–30 mils.

6. A method in accordance with the procedure of claim 5 wherein said applied field is in the direction of said minimum dimension.

References Cited by the Examiner

UNITED STATES PATENTS

| | | | |
|---|---|---|---|
| 2,618,698 | 11/1952 | Janssen | 317—262 X |
| 2,702,427 | 2/1955 | Roberts | 317—262 X |
| 2,706,326 | 4/1955 | Mason | 317—262 X |
| 3,108,211 | 10/1963 | Alleman et al. | 317—262 |

FOREIGN PATENTS 605,860 9/1960 Canada.

MILTON O. HIRSHFIELD, *Primary Examiner.*

J. A. SILVERMAN, *Assistant Examiner.*